United States Patent
Giardinella (10) Patent No.: US 10,316,825 B2
(45) Date of Patent: Jun. 11, 2019

(54) NON-AIR COMPRESSED GAS-BASED ENERGY STORAGE AND RECOVERY SYSTEM AND METHOD

(71) Applicant: Sebastiano Giardinella, Panama City (PA)

(72) Inventor: Sebastiano Giardinella, Panama City (PA)

( * ) Notice: Subject to any disclaimer, the term of this patent is extended or adjusted under 35 U.S.C. 154(b) by 148 days.

(21) Appl. No.: 15/066,324

(22) Filed: Mar. 10, 2016

(65) Prior Publication Data

US 2017/0059212 A1 Mar. 2, 2017

Related U.S. Application Data

(60) Provisional application No. 62/213,171, filed on Sep. 2, 2015.

(51) Int. Cl.
*F02C 6/00* (2006.01)
*F03D 9/17* (2016.01)
*F01K 27/00* (2006.01)

(52) U.S. Cl.
CPC ............... *F03D 9/17* (2016.05); *F01K 27/00* (2013.01); *F02C 6/00* (2013.01)

(58) Field of Classification Search
CPC ...... F03D 9/17; F25B 9/14; F25B 9/06; F25B 43/003; F25B 43/00; F25B 9/002; F25B 2400/141; F25B 2309/1428
USPC .............................................................. 62/6
See application file for complete search history.

(56) References Cited

U.S. PATENT DOCUMENTS

| | | | |
|---|---|---|---|
| 2,942,411 A | 6/1960 | Hutchings | |
| 3,608,323 A * | 9/1971 | Salama | F25J 1/0204 62/613 |
| 4,206,608 A | 6/1980 | Bell | |
| 8,080,895 B1 | 12/2011 | Williams et al. | |
| 8,196,405 B2 * | 6/2012 | Wolf | C25B 1/12 60/649 |
| 8,963,347 B2 | 2/2015 | Baxter | |
| 2010/0275648 A1 | 11/2010 | Mazumder et al. | |
| 2013/0127170 A1 | 5/2013 | McConnell | |
| 2014/0223909 A1 | 8/2014 | Kuczynski et al. | |

OTHER PUBLICATIONS

Joel Hruska, "British company offers efficient energy storage using 'liquid air" Extremetech, retrieved at: http://www.extremetech.com/extreme/137231-british-company-efficient-energy-storagepp, pp. 1-6.

(Continued)

*Primary Examiner* — Ana M Vazquez
(74) *Attorney, Agent, or Firm* — Glenn E. Gold, P.A.; Glenn E. Gold (57) ABSTRACT

A non-air compressed gas-based energy storage and recovery system and method include receiving a quantity of non-air compressible gas and removing contaminants therefrom utilizing a separator/filter then powering a compressor to volumetrically compress the compressible gas. The gas is passed through a cooler to reduce the gas temperature and increase its density and is transferred to a storage vessel. The stored gas is then routed to a heater to increase the temperature of the gas and the gas is expanded in an expander to drive the expander and an electrical generator operably connected thereto in order to generate electric power.

20 Claims, 8 Drawing Sheets

(56) References Cited

OTHER PUBLICATIONS

Kevin Bullis, "Liquefied Air Could Power Cars and Store Energy from Sun and Wind" MIT Technology Review, retrieved at: http://www.technologyreview.com/news/514936/liquefied-air-could-power-cars-and-store-energy-from-sun-and-wind/, pp. 1-2.

D.P. Arnold et al. "A Self-Contained, Flow-Powered Microgenerator System" 2005, pp. 1-4.

\* cited by examiner

NON-AIR COMPRESSED GAS-BASED ENERGY STORAGE AND RECOVERY SYSTEM AND METHOD

CROSS REFERENCE(S) TO RELATED APPLICATION(S)

This non-provisional U.S. patent application claims the benefit of U.S. provisional patent application Ser. No. 62/213,171, filed Sep. 2, 2015, which is hereby incorporated-by-reference herein its entirety.

FIELD OF THE INVENTION

The present invention generally relates to methods, systems and devices used for storing energy. More particularly, the present invention relates to a non-air compressed gas-based energy storage and recovery system and method.

BACKGROUND OF THE INVENTION

Compressed air energy storage (CAES) systems have been used for storing energy in the form of compressed air, for example, in electric energy time shift applications, wherein air is compressed and stored when electrical demand is low, and expanded when electrical demand is high, to recover the stored energy and convert it to electricity. CAES systems typically comprise an air compressor, with one or multiple stages and cooling after each stage, large-volume storage such as an underground cavern, and an expander, with one or multiple stages and heating prior to each expansion stage. The expanded air in CAES can also be mixed with fuel and fed to a combustion turbine to increase its efficiency. On the latter types of systems, the fuel (either natural gas, or other combustible gases), depending on the supply pressure, may require compression in order to reach the turbine admission pressure.

Compressed gases, such as carbon dioxide, nitrogen, oxygen, hydrogen, helium, air, and others, have been used for various industrial and other applications. One of the methods available to transport these gases to their end users involves storing them in high pressure containers to considerably reduce the gas volume. This is usually achieved by using a compression system to fill the gas containers to a desired pressure. The gas is typically treated before each compression stage to remove possible liquids, and cooled after each compression stage to avoid exceeding the maximum temperature allowed by the compression system, and also to maximize the mass of gas inside the container. The filling stage may also require temperature compensation, depending on the environmental conditions, to ensure that pressure variations inside the container resulting from changes in environmental temperature are maintained within allowable ranges. At the user end, the compressed gas inside the containers is typically expanded using a pressure regulator to the desired utility pressure.

One particular form of compressed gas that is increasingly used in transportation and power generation applications is compressed natural gas (CNG). CNG has been used as a source of fuel for natural gas vehicles (NGVs), thermal power generation plants, as well as for transportation of natural gas between different locations where a natural gas pipeline is not feasible (so-called "virtual pipeline" systems). NGV fueling stations typically involve multiple processes including gas odorization, treatment to remove solids, condensates and water, compression (in one, or various stages, including aftercooling and liquids removal), and finally, utilizing a dispenser system to fill the CNG bottles inside the NGVs. Further these processes may also include buffer storage depending on the arrangement of the station (fast-fill, or time-fill). Virtual pipeline systems typically include a compression, or mother station, where CNG bottles are filled, and decompression, unloading, or daughter stations, where the CNG bottles are discharged for end use.

On a larger scale, storage of natural gas at high pressures, typically in underground caverns, has also been used as a means to store natural gas, mostly to balance periods of high and low demand for the fuel. However, these types of systems are not applicable to many locations, as they require specific geological conditions.

The systems and methods described for CAES applications typically only use compressed air as the form in which energy is stored for later conversion to electrical energy. They do not use other available industrial or fuel gases. Furthermore, these systems are generally conceived to compress, store and expand the air at the same location, and do not have the flexibility to permit the compression and expansion stages to be placed at different locations. The systems and methods described for containerized compressed gases have been conceived and used for the storage and transportation of different industrial or fuel gases for their final use. However, they have not been conceived to convert and later produce electrical energy in a manner similar to how CAES stores the energy in compressed air. Further, the systems and methods for large scale storage require specific geologic at the site, and are not applicable where there is a lack of appropriate geologic formations such as underground caverns.

SUMMARY OF THE INVENTION

The present invention is generally directed to a system and method for storing energy in the form of compressed gases (e.g., carbon dioxide, nitrogen, oxygen, hydrogen, helium, natural gas, or other), other than atmospheric air, in a container, and later recovering the stored energy in order to produce electricity or electric power. Hereinafter, the system and method are referred to as "non-air" compressed gas-based energy storage and recovery system and method.

In a basic aspect of the present invention, a non-air compressed gas-based energy storage and recovery system includes:
- at least one pre-treatment stage adapted to receive a quantity of non-air compressible gas and remove contaminants therefrom;
- at least one compression stage adapted to receive and volumetrically compress the quantity of pre-treated non-air gas;
- at least one cooling stage adapted to receive the quantity of pre-treated and compressed non-air gas and reduce the temperature and increase the density thereof;
- at least one storage stage adapted to receive the quantity of pre-treated, compressed and cooled non-air gas and store the quantity of pre-treated, compressed and cooled non-air gas in at least one storage vessel as a quantity of stored energy; and at least one expansion stage adapted to recover the quantity of stored energy and convert the stored energy to electric power.

In another aspect of the present invention, the at least one pre-treatment stage includes a separator/filter, and the at least one compression stage includes a compressor powered by a motive power source, wherein the motive power source is one of a turbine, motor or engine.

In another aspect of the present invention, the at least one cooling stage includes a cooler in the form of a heat exchanger utilizing a cooling fluid. The pre-treatment and cooling stages can be repeated to remove possible liquids from the non-air gas and cool the non-air gas after each compression stage.

In another aspect of the present invention, the at least one expansion stage includes at least one heater that recovers the quantity of stored energy by routing thereto from the storage vessel and heats the quantity of stored energy to increase the temperature and reduce the density thereof. The heater may be a heat exchanger utilizing a heating fluid. The at least one expansion stage also includes an expander in which the heated quantity of stored energy is expanded to drive the expander and an electrical generator operably connected thereto to convert the stored energy to electric power.

In another aspect of the present invention, the at least one expansion stage includes multiple feed valves for routing stored energy at different levels of pressure and an expander having different pressure sections for receiving the stored energy at the corresponding different levels of pressure in which the stored energy is expanded to drive the expander and an electrical generator operably connected thereto to convert the stored energy to electric power.

In another aspect of the present invention, the at least one storage vessel includes multiple storage vessels being fed a quantity of pre-treated, compressed and cooled non-air gas in a sequence at different levels of pressure via multiple compression stages and multiple cooling stages.

In another aspect of the present invention, a non-air compressed gas-based energy storage and recovery method includes:
  in at least one pre-treatment stage, receiving a quantity of non-air compressible gas and removing contaminants therefrom;
  in at least one compression stage, receiving and volumetrically compressing the pre-treated non-air compressible gas;
  in at least one cooling stage, receiving the quantity of pre-treated and compressed non-air gas and reducing the temperature and increase the density thereof;
  in at least one storage stage, receiving the quantity of pre-treated, compressed and cooled non-air gas and storing the quantity of pre-treated, compressed and cooled non-air gas as stored energy; and
  in at least one expansion stage, recovering the stored energy and converting the stored energy to electric power.

In another aspect of the present invention, in the at least one storage stage at a first location, the quantity of pre-treated, compressed and cooled non-air gas is received and then stored as stored energy at the first location. The stored energy is then transported from the first location to a second location where in at least one expansion stage at the second location, the stored energy is recovered and then converted to electric power.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as a preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
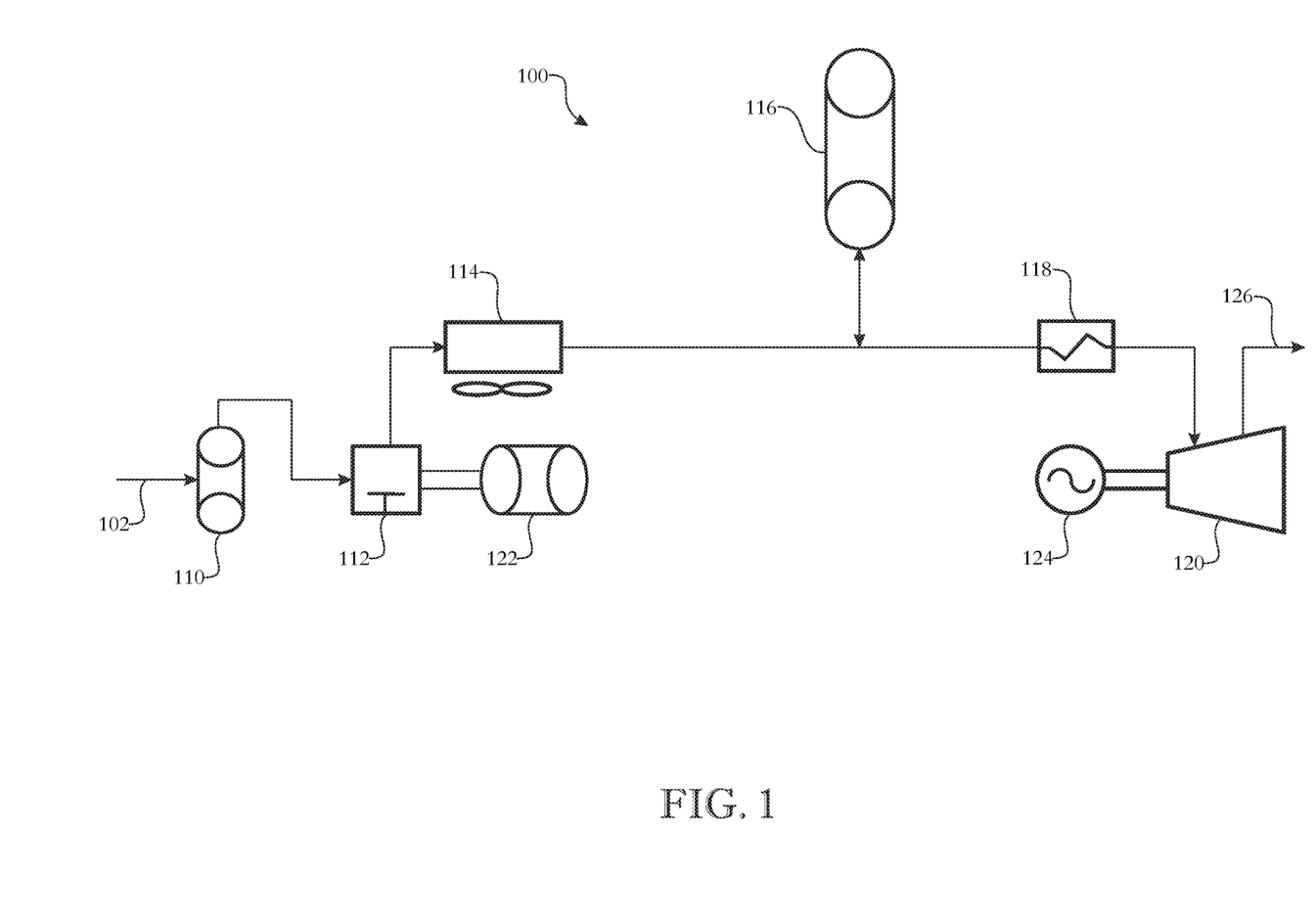
FIG. 1 presents a schematic illustration of an exemplary embodiment of a non-air compressed gas-based energy storage and recovery system and method, showing the general components and operational steps thereof in accordance with aspects of the present invention.

In a basic exemplary implementation of the present invention, in FIG. 1 there is shown a non-air compressed gas-based energy storage system, generally designated 100, illustrating its various components for carrying out the stages of its operation. A non-air compressible gas is introduced to the system 100 via an input conduit 102. The gas is initially introduced to a gas pre-treatment device 110 where contaminants such as liquids and solid particles are removed from the gas. The pre-treated gas is then transferred to a compressor 112 driven by a motive power source 122 where the pre-treated gas is volumetrically compressed and routed through a cooler 114 to reduce the gas temperature and increase its density. The filtered, compressed and cooled gas can then be transferred to a storage vessel 116 wherein the filtered, compressed and cooled gas, during times of low electrical demand, may be stored for later use. At times of high demand, the filtered, compressed and cooled gas when needed for use can be routed directly from the cooler 114 or recovered from the storage vessel 116 and routed to a heater 118 where the filtered and compressed gas temperature is increased prior to expansion and then to an expander 120 which is coupled to, and drives, an electrical generator 124 that produces electric power, the expanded gas is then delivered to its end user as represented by output line 126.

By way of example, but not limitation, in the non-air compressed gas-based energy storage and recovery system 100 the gas pretreatment device 110 can be in the form of a separator/filter, and the cooler 114 can be in the form of a heat exchanger utilizing a cooling fluid such as water. Also, the heater 118 can be in the form of a heat exchanger using a heating fluid such as steam or hot oil. The motive power source 122 can be in the form of a turbine, an electric motor or an engine driver.

Figure 2:
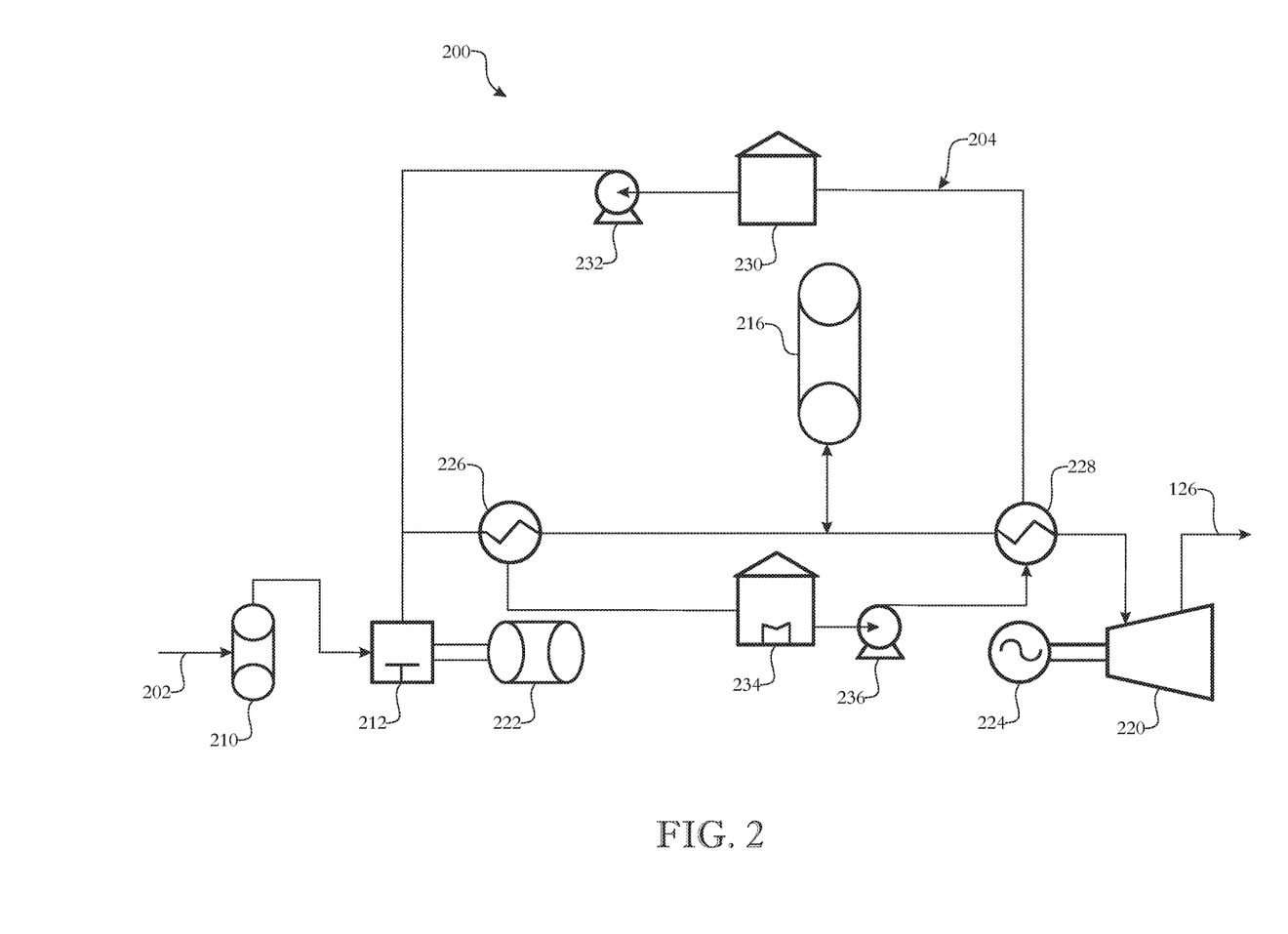
FIG. 2 presents a schematic illustration of another exemplary embodiment of the non-air compressed gas-based energy storage and recovery system and method wherein a heat exchanger is used to cool the gas after compression in accordance with aspects of the present invention.

Referring now to FIG. 2, there is shown another embodiment of the non-air compressed gas-based energy storage system, generally designated 200, illustrating its various components for carrying out the stages of its operation. A non-air compressible gas is introduced to the system 200 via an input conduit 202. The non-air compressible gas is initially introduced to a separator/filter 210 where liquid and solid particles are removed from the gas. The filtered gas is then transferred to a compressor 212 driven by a motive power source 222 where the filtered gas is volumetrically compressed and routed through a cooler 226 to reduce the gas temperature and increase its density. The filtered, compressed and cooled gas can then be transferred to a storage vessel 216 wherein the filtered, compressed and cooled gas, during times of low electrical demand may be stored for later use, or, at times of high demand, the filtered, compressed and cooled gas when needed for use can be routed directly from the cooler 214 or recovered from the storage vessel 216. The filtered, compressed and cooled gas is then routed to a heater, such as a heat exchanger, 228 where the filtered and compressed gas is heated prior to expansion and then routed to an expander 220 which is coupled to, and drives, an electrical generator 224 that produces electric power, the expanded gas is then delivered to its end user as represented by output line 226.

The system 200 further includes a heat exchange circuit 204 which includes a cold fluid tank 230 in which is stored a cold fluid while the system 200 is in energy storage mode. In use, the cold fluid is pumped from the cold fluid tank using a cold fluid pump 232 to the heat exchanger 226 to cool the filtered and compressed gas passing therethrough. The cold fluid, now heated, is then routed to a hot fluid tank 234 and stored therein. In energy recovery mode, the fluid stored in the hot fluid tank 234, heated to compensate for heat losses in the system, is pumped, using a hot fluid pump 236, to the heat exchanger 228 where thermal energy from the fluid is transferred to the filtered and compressed gas prior to expansion. The fluid is then routed to and stored, at a lower temperature in the cold fluid tank 230. This arrangement has the benefit of improving the energy efficiency of the overall process as it stores the heat removed from the gas during its compression for later use when the energy storage and recovery sections of the process are in the same location.

The separator/filter 110, 210, compressors 112, 212, the expanders 120, 220, the cooler 114, the heater 118, the heat exchanger 226 and the heat exchanger 128 as described with respect to the systems 100, 200 illustrated in FIGS. 1-2, respectively, are illustrated in a single stage compressor and single stage expander arrangement. However, those practiced in the art will understand that the compressors 112, 212 may be a series of compressors or compressor stages with a cooler 114 or a heat exchanger 226 and a separator/filter 110, 210 between each compressor or each compressor stage. Those practiced in the art will further understand that the expander 120, 220 may be a series of expanders or expander stages with a heater 118 or heat exchanger 128 located before each stage, further, the storage vessel 116, 216 can be any one or multiple containers of significant volume such as, but not limited to, cylinders, spheres, pressurized vessels, or a pipeline.

Figure 3:
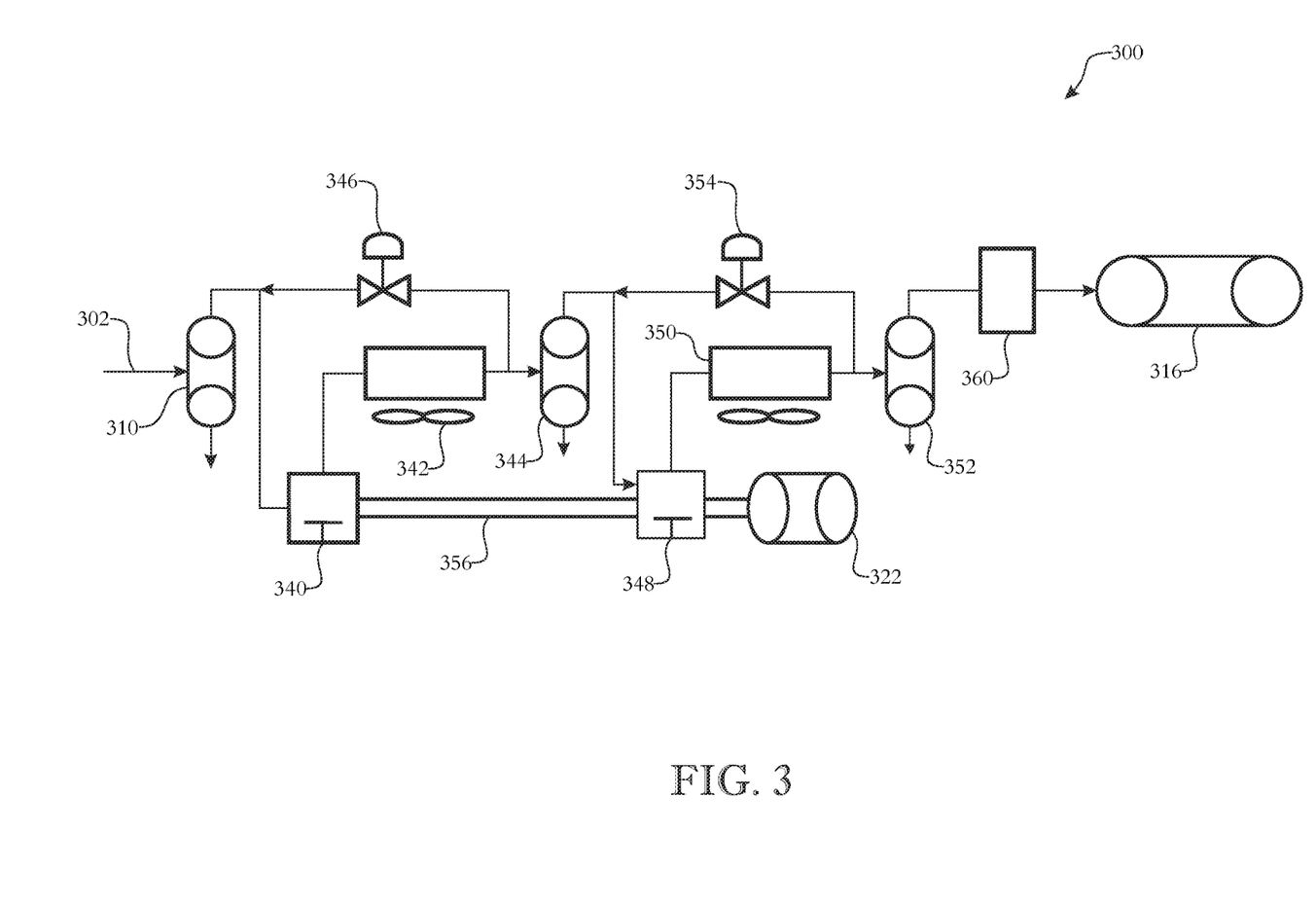
FIG. 3 presents a schematic illustration of an exemplary embodiment of a compression section of the non-air compressed gas-based energy storage and recovery system and method, showing a two-stage compressors with intermediate and after cooling in accordance with aspects of the present invention.

Referring now to FIG. 3, there is illustrated an exemplary embodiment of a two-stage compressor-based compression section 300 in conjunction with a portion of the aforementioned non-air compressed gas-based energy storage and recovery system showing the main components of the compression section 300. The non-air gas passes through a separator/filter 310 to remove possible fluid droplets and particles prior to entering a first stage compressor 340. The filtered and compressed gas discharged from a first stage compressor 340 is cooled utilizing an interstage cooler 342 and is then passed through a second stage separator/filter 344 prior to entering a second stage compressor 348. The filtered and compressed gas discharged from the second stage compressor 348 is cooled by routing through an after cooler 350 wherein the filtered, compressed and cooled gas is again passed through a discharge separator 352 prior to being fed to the storage vessel 316. A temperature compensator 360 terminates the gas flow to the storage vessel 316 when the pressure inside the storage vessel 316 reaches a preset limit. The preset limit is calculated taking into account the external environment temperature. A first stage recycle valve 346 and a second stage recycle valve 354 recirculate the gas in case the flow of the filtered, compressed and cooled gas is stopped downstream. The first stage compressor 340 and the second stage compressor 348 are interconnected and driven by a single driveshaft 356 which, in turn, is driven by a motive power source, such as electric motor, 322. Those practiced in the art will understand that the two-stage compressor-based compression section 300 illustrated is not intended to be limiting, since different compressors or drive systems can be utilized in lieu thereof. For simplicity, the compression section 300 illustrated in FIG. 3 does not show all valves, instruments, controls, or other items that are typically included in the systems and generally known to those practiced in the art.

Figure 4:
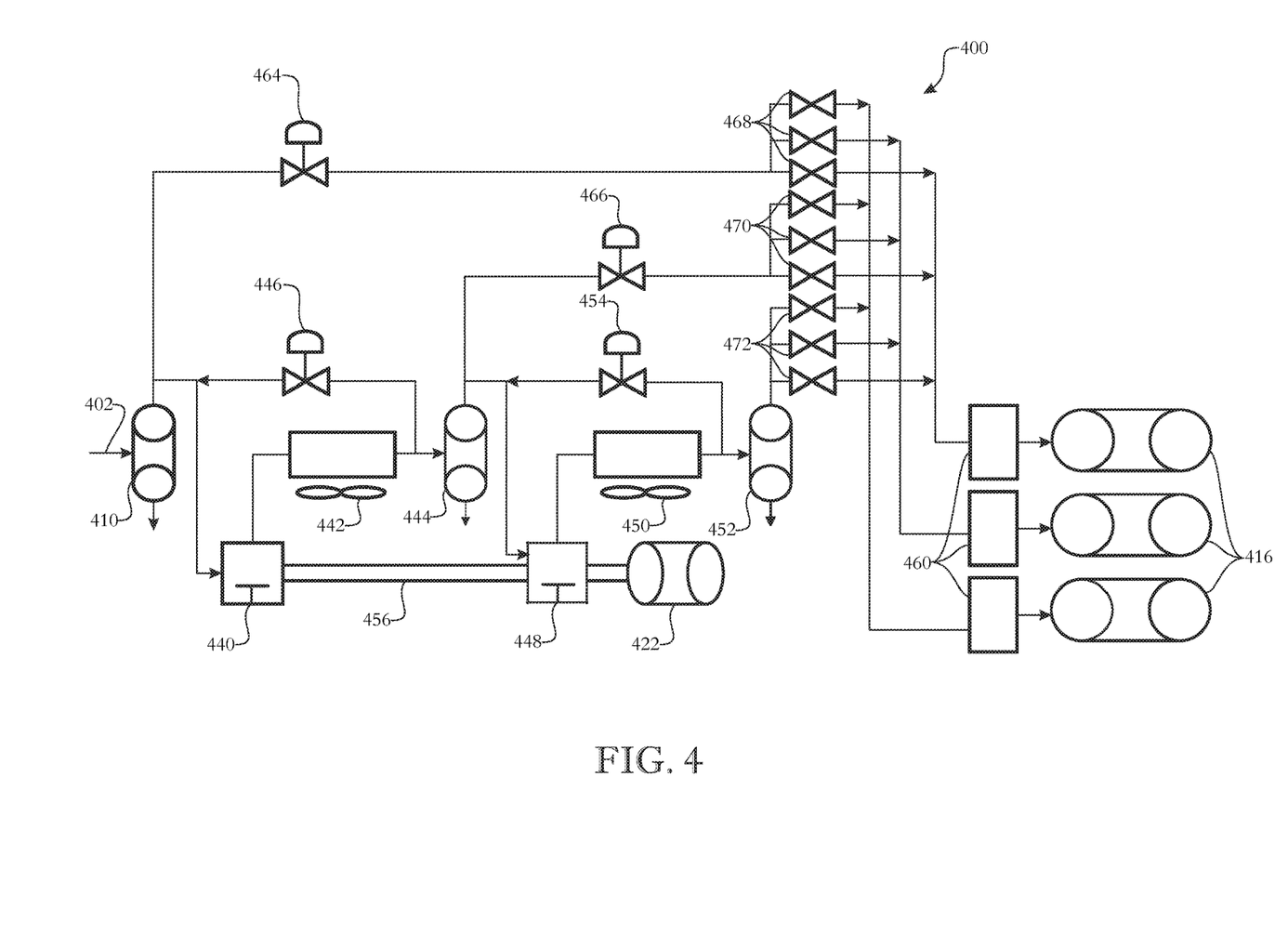
FIG. 4 presents a schematic illustration of another exemplary embodiment of a compression section of the non-air compressed gas-based energy storage and recovery system and method, wherein the gas is fed from different compressor stages in a sequence, from low to high pressure in accordance with aspects of the present invention.

Referring now to FIG. 4, there is shown another exemplary embodiment of a compression section 400 in conjunction with a portion of the aforementioned non-air compressed gas-based energy storage and recovery system wherein the single storage vessel 116, 216, 316 are represented as multiple storage vessels 416. The storage vessels 416 are fed in a sequence at different (for example, low, medium and high) pressure levels. As illustrated, for example, when the top storage vessel 416 has an internal pressure that is lower than the pressure of the input gas pressure at a first stage compressor 440, the top storage vessel 416 is fed from a low-pressure gas flow valve 464. As the pressure in the top storage vessel 416 reaches a value approaching the input pressure to the first stage compressor 440, it is then fed from a medium pressure gas flow valve 466. Finally, when the pressure in the top storage vessel 416 approaches the input pressure to the second stage compressor 448, it receives the discharge from the second stage compressor 448 until the top storage vessel 416 is full. A set of low-pressure valves 468, a set of medium pressure valves 470, and a set of high-pressure valves 472 are used to align the different pressure feeds to the top, middle and bottom storage vessels 416 in a sequential manner. This arrangement has the advantage of reducing the overall power consumption versus a multistage compressor without intermediate extractions. For simplicity, the compressor section 400 illustrated in FIG. 4 does not show all valves, instruments, controls, or other items that are typically included in the systems and generally known to those practiced in the art.

Figure 5:
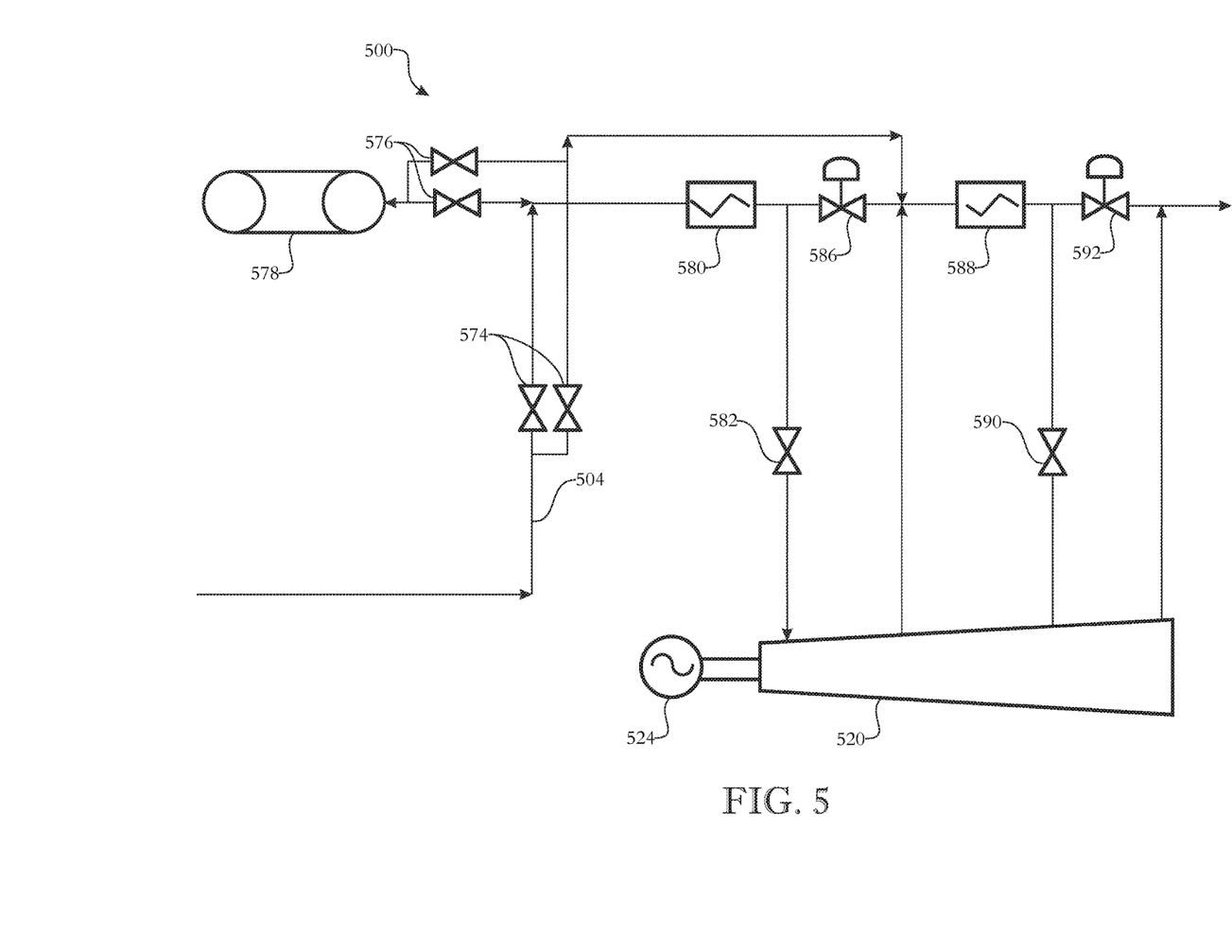
FIG. 5 presents a schematic illustration of an exemplary embodiment of an expansion section of the non-air compressed gas-based energy storage and recovery system and method, showing a two stage expander with suction and intermediate heating in accordance with aspects of the present invention.

Referring now to FIG. 5, there is illustrated an exemplary embodiment of an expansion section 500 in conjunction with a portion of the aforementioned non-air compressed gas-based energy storage and recovery system, showing the main components of an expander 520 of the expansion section 500 with an intermediate pressure extraction and reheating. As a function of the upstream pressure of the non-air compressed gas flowing into the expansion section 500 via conduit 504, a set of valves 574 can be utilized to align the gas to the expander 520 high or intermediate pressure sections to improve efficiency. Buffer storage of compressed gas, if required, such as when the compressed gas arrives from a distant source, can be achieved with a compressed gas buffer vessel 578. A set of valves 576 is utilized to align the compressed gas buffer vessel 578, when applicable, to the high or intermediate pressure sections of the expander 520 depending on the pressure in the compressed gas buffer vessel 578. The temperature of the compressed gas is raised in an expander suction heater 580 wherein the compressed gas is then passed through the expander 520. The intermediate pressure compressed gas is reheated by passing the compressed gas through a re-heater 588 and then fed through the final expansion section of the expander 520. The high and intermediate pressure sections of the expander 520 can be isolated utilizing a high-pressure feed valve 582 and a medium pressure feed valve 590, respectively, while a high-pressure bypass valve 586 and a medium pressure bypass valve 592, respectively can be utilized to decompress the gas in the event that the expander 520 is stopped. The work in the expander 520 is converted to electricity by the electrical generator 524 operably connected thereto. For simplicity, FIG. 5 does not show all valves, instruments, controls, or other items typically included in these systems and generally known to those practiced in the art.

Figure 6:
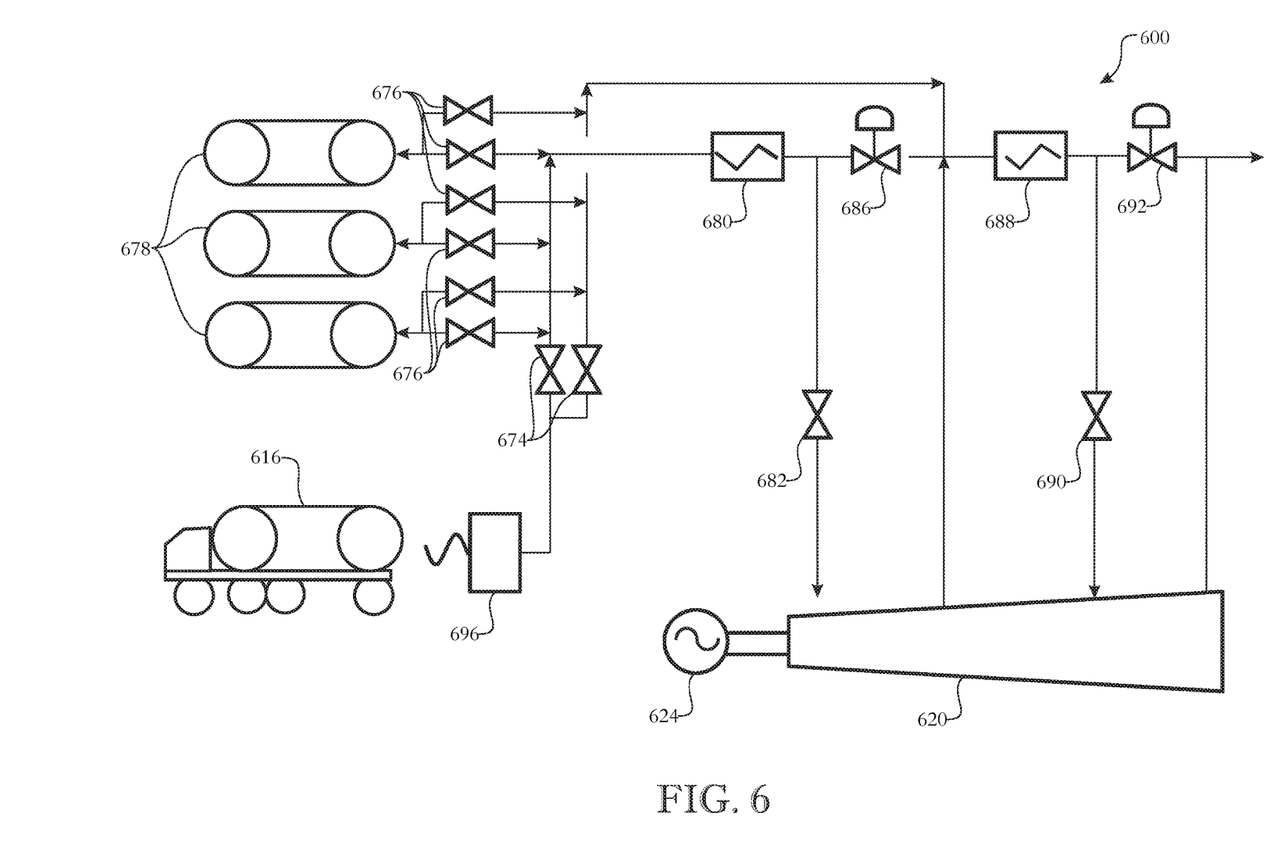
FIG. 6 presents a schematic illustration of another exemplary embodiment of an expansion section of the non-air compressed gas-based energy storage and recovery system and method, wherein compressed gas is discharged from mobile containers, stored in buffer tanks, and expanded by selectively feeding the expander at different stages depending on the pressure in accordance with aspects of the present invention.

Another exemplary embodiment of an expansion section 600 in conjunction with a portion of the aforementioned non-air compressed gas-based energy storage system is illustrated in FIG. 6. It is representative of a facility that receives a non-air gas compressed in a different location and is transported to the facility by truck, such as a CNG daughter station, or any facility receiving compressed gas in containers. The non-air gas is transported to the facility site by truck, rail, ship, or other means in a compressed gas storage vessel 616 and is unloaded using a compressed gas unloading system 696. The compressed gas can then be fed to the expander 620 or stored in a compressed gas buffer vessel 678 in the event that buffer storage is required at the facility location. The expansion section 600 as shown in FIG. 6 utilizes three individual compressed gas buffer vessels 678. However, those practiced in the art will understand that one or a plurality of buffer vessels 678 of a significant volume can be utilized and can comprise cylinders, spheres, pressurized vessels, or a pipeline. A set of valves 674 can be utilized to align the gas discharged by the compressed gas storage vessel 616 to the expander 620 high or intermediate pressure sections to improve efficiency. A set of valves 676 is utilized to align the compressed gas buffer vessel 678, when applicable, to the high or intermediate pressure sections of the expander 620 depending on the pressure in the compressed gas buffer vessel 678. The temperature of the compressed gas is raised in an expander suction heater 680 wherein the compressed gas is then passed through the expander 620. The intermediate pressure compressed gas is reheated by passing the compressed gas through a re-heater 688 and then fed through the final expansion section of the expander 620. The high and intermediate pressure sections of the expander 620 can be isolated utilizing a high-pressure feed valve 682 and a medium pressure feed valve 690, respectively, while a high-pressure bypass valve 686 and a medium pressure bypass valve 692, respectively can be utilized to decompress the gas in the event that the expander 620 is stopped. The work in the expander 620 is converted to electricity by the electrical generator 624 operably connected thereto. For simplicity, FIG. 6 does not show all valves, instruments, controls, or other items typically included in these systems and generally known to those practiced in the art.

Figure 7:
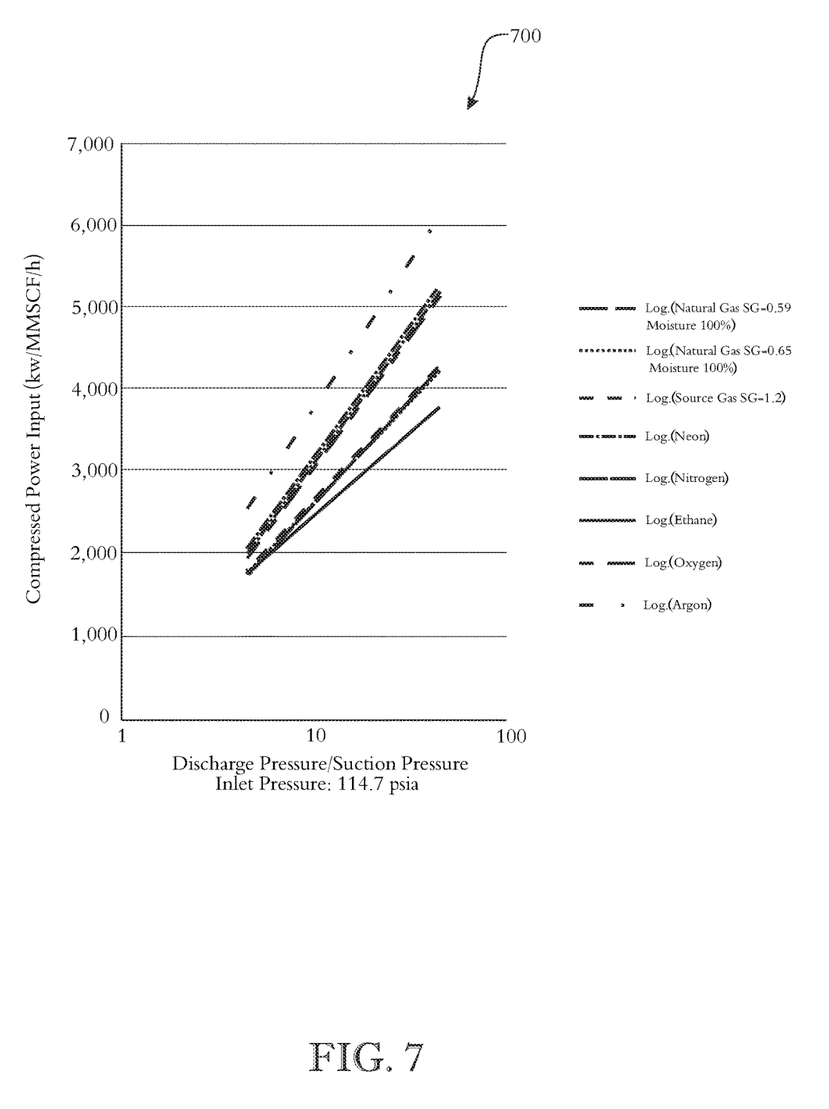
FIG. 7 presents an exemplary graph of the compressor power consumption as a function of the compressor discharge to suction pressure ratio for different gases, assuming typical efficiencies and process conditions, with intermediate cooling and no extraction between stages.
Figure 8:
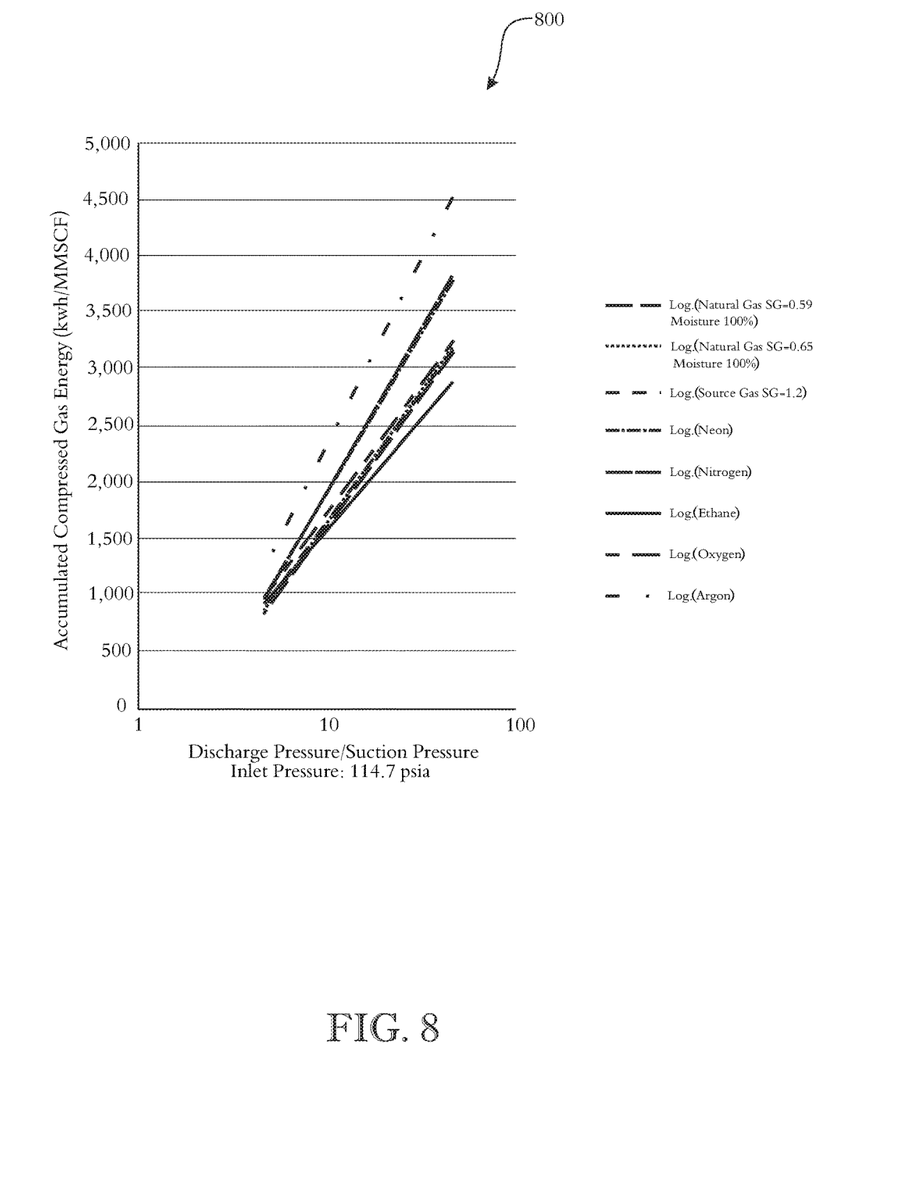
FIG. 8 presents an exemplary graph of the energy being accumulated in the compressed gas as a function of the compressor discharge to suction pressure ratio for different gases, assuming typical efficiencies and process conditions, with intermediate cooling and no extraction between stages.

Turning now to FIGS. 7-8, an exemplary compressor power consumption curve versus compression ratio for different gases 700 is illustrated in FIG. 7. The curve 700 is based on a multi-stage compressor with typical efficiencies, and inlet pressure of 114.7 psia (7.91 bar), interstage cooling and no interstage extractions. The curve 700 represents the instantaneous power consumption for the compressor; however, the filling of the container is a time-dependent process. The curve 800 representing actual energy being accumulated in the compressed gas for later recovery is illustrated, for example, in FIG. 8 and is based on the same assumptions. Those practiced in the art will understand that the values in the curves shown in FIGS. 7-8 can vary widely depending on the system arrangement, compressor type and manufacturer, among other variables, and hence the curves illustrated in FIGS. 7-8 are indicative only, and cannot be taken as actual performance parameters for the final system.

As illustrated in FIGS. 7-8, nitrogen, oxygen, neon and argon can accumulate energy at a higher density than natural gas and other hydrocarbon gases such as ethane. However, the former gases typically require more stages for an equal compressor discharge to input pressure ratio than the latter natural gas and hydrocarbon gases.

When expanding, approximately 60-70% or greater of the energy used in compression can be recovered to generate electricity, depending on the system arrangement, compressor and expander types and manufacturers, among other variables. The highest overall process efficiency is achieved ideally when the heat extracted during compression is then returned during expansion of the gas in the compressed gas energy storage system 200 as illustrated in FIG. 2. Inefficiencies such as heat losses, require further heat input to the system.

In instances where the compression and expansion sections are placed in different locations or sites, such as in the case of virtual pipeline systems, then heat storage may not be feasible and the heat may need to be added by burning excess fuel. For instance, in the case of CNG, a very small portion (for example, less than 1%) of the total natural gas being expanded needs to be burned in order to heat the gas prior to expansion. CNG decompression stations typically include heaters before expanding the gas and pressure regulation valves, and hence the addition of an expander coupled to an electric generator will increase the overall efficiency.

The advantage of the inventive compressed gas energy storage systems include, but are not limited to, utilization as a means of large-scale energy storage using any available source of compressed gas, other than air, independent of location. The systems do not require a large underground reservoir and can be readily adapted to existing or new facilities for the production and consumption of compressed gases as further described below. These systems make use of their installed devices and subsystems to reduce the overall additional investment.

For an industrial facility that produces high-pressure industrial gas, such as compressed hydrogen, nitrogen, oxygen, helium, or other gas, where a compression stage is previously installed, the systems and methods disclosed herein can be implemented to also convert the facility into an energy storage facility by adding buffer storage and an expander coupled to an electric generator as shown, for example in FIG. 5.

In a similar manner, an existing CNG production facility, CNG daughter station, or NGV fueling station can also be converted to an energy storage facility by installing the expansion section 600 as illustrated in FIG. 6. In many of these facilities, the CNG bottles, or buffer tanks (in buffer-fast fill NGV stations) can also be used as the compressed gas storage section of this embodiment, hence requiring only an expander coupled to an electric generator and heating, in order to complete the process. In these cases, the expanded gas is fed to the final user at a lower or intermediate pressure.

In yet another application of the embodiments disclosed herein, the systems and sub-systems can be installed in the gas supply line of a thermal power generation station. In this application, the compressors operate during off-peak hours to feed the power generation equipment (e.g., combustion turbine), and the excess gas is further compressed and stored in buffer storage vessels. During peak hours, the gases are expanded to the fuel gas supply pressure, generating an additional power output and improving the overall efficiency of the thermal power plant. This is especially suited to load-following or peaking plants, where the power output increases as the demand increases.

In yet another application, the compressed gas consumer, such as a thermal power plant receiving CNG, can receive previously compressed gas at an unloading station such as those used at the receiving end of a virtual pipeline system. This application expands only the portion of the gas that is required for the continuous operation during off-peak electrical demand hours, and gradually fills buffer storage vessels using the pressure available in the compressed gas containers with the excess flow rate. During peak electrical demand hours, the gas in the buffer storage vessels is released, heated and expanded to generate electricity. The rate of discharge from the system can be steady if the consumer consumption rate is fixed, in which case the highest portion of the delivered gas flow rate comes from the transported containers during off-peak hours and from the buffer storage tanks during peak hours. Alternatively, the consumption can be ramped with the gas user and increasing during peak hours. The latter case is particularly best suited to thermal power plants operating in load-following or peaking operations.

Also, the non-air compressed gas-based energy storage and recovery method of the present invention facilitates simultaneous storing of natural gas and electric energy during times of low demand, when both the natural gas and the electricity prices are low, and returning them to their systems (e.g., natural gas pipeline and electric grid, respectively) in times of high demand, when both utility prices are high again. Further, the method facilitates use where existing gas compression facilities are in place; and also in different locations, with the gas being compressed at one location, and expanded at a different location.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claim is:

1. A non-air compressed gas-based energy storage and recovery system, comprising:
   at least one pre-treatment stage adapted to receive an initial quantity of non-air compressible gas from a non-air gas feed, and to remove contaminants therefrom, said initial quantity of non-air compressible gas having an initial volume, density, and temperature;
   at least one compression stage adapted to receive and volumetrically compress the initial quantity of pre-treated non-air gas to a post-compressed volume, density, and temperature;
   at least one cooling stage adapted to receive the quantity of pre-treated and compressed non-air gas, reduce the post-compressed temperature thereof to a post-cooled temperature, and increase the post-compressed density thereof to a post-cooled density;
   at least one storage stage adapted to receive the initial quantity of pre-treated, compressed and cooled non-air gas, and subsequently store the initial quantity of pre-treated, compressed, and cooled non-air gas in at least one storage vessel as a quantity of stored energy;
   at least one expansion stage adapted to recover the quantity of stored energy and convert the stored energy to electric power; and
   at least one temperature compensator regulating charging and discharging cycles of the system, such that, upon an occurrence of an interior pressure of said at least one storage vessel reaching a preset maximum or minimum pressure limit during a charging mode, said at least one temperature compensator automatically terminates gas flow to said at least one storage vessel, said preset maximum or minimum pressure limit having a value calculated taking into account a respective external environment temperature.

2. The system of claim 1 wherein said pre-treatment stage comprises a separator/filter.

3. The system of claim 1 wherein said at least one compression stage comprises a compressor powered by a motive power source.

4. The system of claim 3 wherein said motive power source comprises at least one of a turbine, a motor, and an engine.

5. The system of claim 1 wherein said at least one cooling stage comprises a cooler in the form of a heat exchanger utilizing a cooling fluid.

6. The system of claim 5 wherein said pre-treatment and cooling stages are repeated to remove possible liquids from the non-air gas and cool the non-air gas after each compression stage.

7. The system of claim 1 wherein said at least one expansion stage comprises at least one heater that recovers the quantity of stored energy by routing said quantity of stored energy thereto, from said storage vessel, and heats the quantity of stored energy via said heater to increase the temperature of said quantity of stored energy to a post-expansion stage temperature and reduce the density thereof to a post-expansion stage density.

8. The system of claim 7 wherein said heater comprises a heat exchanger utilizing a heating fluid.

9. The system of claim 7 wherein said at least one expansion stage further comprises an expander in which a volume of the heated quantity of stored energy is expanded to drive the expander and an electrical generator operably connected thereto to convert the stored energy to electric power.

10. The system of claim 7 wherein said at least one expansion stage further comprises a plurality of feed valves for routing the stored energy at different respective levels of pressure, and an expander having a plurality of different pressure level sections enabling receipt of the stored energy at the corresponding different levels of pressure in which the stored energy is expanded to drive the expander, and an electrical generator operably connected thereto, to convert the stored energy to electric power.

11. The system of claim 1 wherein said at least one storage vessel comprises multiple storage vessels being fed a quantity of pre-treated, compressed and cooled non-air gas in a sequence at different levels of pressure via multiple compression stages and multiple cooling stages.

12. A non-air compressed gas-based energy storage and recovery method, comprising the steps of:
providing a non-air compressed gas-based energy storage and recovery system comprising:
at least one pre-treatment stage adapted to receive an initial quantity of non-air compressible gas and to remove contaminants therefrom, said quantity of non-air compressible gas having an initial volume, density, and temperature;
at least one compression stage adapted to receive and volumetrically compress the initial quantity of pre-treated non-air gas to a post-compressed volume, density, and temperature;
at least one cooling stage adapted to receive the quantity of pre-treated and compressed non-air gas, reduce the post-compressed temperature thereof to a post-cooled temperature, and increase the post-compressed density thereof to a post-cooled density;
at least one storage stage adapted to receive the quantity of pre-treated, compressed and cooled non-air gas, and store the quantity of pre-treated, compressed and cooled non-air gas in at least one storage vessel as a quantity of stored energy;
at least one expansion stage adapted to recover the quantity of stored energy and convert the stored energy to electric power; and
at least one temperature compensator regulating charging and discharging cycles of the system;
in said at least one pre-treatment stage, receiving a quantity of non-air compressible gas and removing contaminants therefrom;
in said at least one compression stage, receiving and volumetrically compressing the pre-treated non-air compressible gas;
in said at least one cooling stage, receiving the quantity of pre-treated and compressed non-air gas and reducing the temperature and increase the density thereof;
in said at least one storage stage, receiving the quantity of pre-treated, compressed and cooled non-air gas and storing the quantity of pre-treated, compressed and cooled non-air gas as stored energy;
in said at least one expansion stage, recovering the stored energy and converting the stored energy to electric power; and
in said at least one temperature compensator, regulating said charging and discharging cycles such that upon an occurrence of an interior pressure of said at least one storage vessel reaching a preset maximum or minimum pressure limit during a charging mode, said at least one temperature compensator automatically terminates gas flow to said at least one storage vessel by stopping a motive power source of the compression stage, isolating the storage stage, said preset maximum or minimum pressure limit having a value calculated taking into account a respective external environment temperature.

13. The method of claim 12 wherein in said pre-treatment stage the contaminants are removed from the quantity of non-air compressible gas with a separator/filter.

14. The method of claim 12 wherein in said at least one compression stage a compressor is powered by a motive power source to volumetrically compress the quantity of pre-treated gas.

15. The method of claim 12 wherein in said at least one cooling stage the temperature of the quantity of pre-treated and compressed non-air gas is reduced by passing the quantity of pre-treated and compressed non-air gas through a cooler.

16. The method of claim 12 wherein in said at least one expansion stage the quantity of stored non-air gas is recovered from said at least one storage stage by routing and heating the stored energy to increase the temperature and reduce the density thereof.

17. The method of claim 16 wherein in said at least one expansion stage the heated quantity of stored energy is received and expanded in an expander to drive the expander and an electrical generator operably connected thereto to convert the stored energy to electric power.

18. The method of claim 12 wherein in said at least one expansion stage the stored energy is routed at different levels of pressure to an expander having different pressure sections for receiving the stored energy at the corresponding different levels of pressure in which the stored energy is expanded to drive the expander and an electrical generator operably connected thereto to convert the stored energy to electric power.

19. The method of claim 12 wherein in said at least one storage stage multiple storage vessels are fed in a sequence at different levels of pressure via multiple compression stages and multiple cooling stages.

20. A non-air compressed gas-based energy storage and recovery method, comprising the steps of:
- in at least one pre-treatment stage, receiving, from a non-air gas feed, a quantity of non-air compressible gas and removing contaminants therefrom;
- in at least one compression stage, receiving and volumetrically compressing the pre-treated non-air compressible gas;
- in at least one cooling stage, receiving the quantity of pre-treated and compressed non-air gas and reducing the temperature and increase the density thereof;
- in at least one storage stage at a first location, receiving the quantity of pre-treated, compressed and cooled non-air gas and storing the quantity of pre-treated, compressed and cooled non-air gas as stored energy at the first location, said storage stage being loaded with a mass of cushion gas of the same composition as the pre-treated non-air gas;
- transporting the stored energy from the first location to a second location;
- in at least one temperature compensator at a first location, regulating the charging mode such that, during a charging mode, pressure inside the storage stage is prevented from exceeding a preset maximum pressure value;
- in at least one expansion stage at a second location, recovering the stored energy and converting the stored energy to electric power; and
- in at least one temperature compensator at said second location, regulating the discharging mode, such that the pressure and temperature in the storage stage are prevented from falling below respective preset pressure and temperature minimum values.

* * * * *